United States Patent [19]

Church et al.

[11] Patent Number: 4,829,630
[45] Date of Patent: May 16, 1989

[54] WINDOW SLIDER

[75] Inventors: Claire Church, Romeo; Ronald D. Clarke, Algonac, both of Mich.

[73] Assignee: Consolidated Industrial Corporation, Birmingham, Mich.

[21] Appl. No.: 104,765

[22] Filed: Oct. 2, 1987

[51] Int. Cl.$^4$ .................... A47H 15/00; E05D 15/16; E05F 11/38
[52] U.S. Cl. .................... 16/93 R; 16/93 D; 16/90; 49/374; 49/428; 49/441
[58] Field of Search ............ 16/90, 93 R, 95 R, 93 D, 16/DIG. 6; 296/201, 216, 223; 49/227, 374, 375, 428, 441, 502; 292/341.12, DIG. 56, DIG. 73; 70/463

[56] References Cited

U.S. PATENT DOCUMENTS

| 1,502,644 | 7/1924 | Campbell | 49/428 |
| 1,621,508 | 3/1927 | Holt | 49/441 |
| 3,466,802 | 9/1969 | Doveinis et al. | 49/428 |
| 3,466,803 | 9/1969 | Packett | 49/441 |
| 4,069,617 | 1/1978 | Koike | 49/428 |
| 4,114,945 | 9/1978 | Lutz | 16/93 R |

FOREIGN PATENT DOCUMENTS 1190350  5/1970  United Kingdom ................. 49/374

Primary Examiner—Nicholas P. Godici
Assistant Examiner—William Scott Andes
Attorney, Agent, or Firm—Ralph M. Burton

[57] ABSTRACT

A window slider for guiding a vehicle window in a guide channel having spaced, side and base walls comprises a one-piece molded plastic part having stiffly resilient projections integral with the part and extending laterally in two directions to bear against the side and base walls to prevent rattling of the slider in two directions in the channel. Several embodiments are disclosed.

16 Claims, 3 Drawing Sheets

WINDOW SLIDER

DESCRIPTION

1. Field of the Invention

This invention relates to improvements in sliders for supporting and/or guiding vertically moveable vehicle windows.

2. Background of the Invention

Several prior U.S. patents, namely U.S. Pat. Nos. 1,621,508; 3,466,802; 3,466,803; 4,069,617; 4,114,945, have been devoted to the provision of slides or guide rollers for supporting vertically moveable windows in window guideway channels. In automotive applications there has been a continuing problem of preventing window slides from rattling in the guide channels. In U.S. Pat. No. 3,466,803 provision is made for preventing rattling of the window sliders in one lateral direction in the guide channel. In U.S. Pat. No. 3,466,802 provision is made for preventing rattle in two lateral directions in the window guide channel, by biasing portions of the slider laterally against the side walls and the opposed based walls of the guide channel. However, in this prior art, the efforts to prevent rattle of the sliders by biasing the slider in two lateral directions has involved either complicated slider mechanisms including several cooperating pieces and spring elements which unacceptably increase the cost of the slider or the slider design has not functioned effectively to prevent rattle.

SUMMARY OF THE INVENTION

We have conceived of a one-piece molded plastic slider so designed that integral projections thereof extend laterally in two directions and are elastically squeezed between the side and base walls of the window guide channel so that the slider is biased within the channel in two directions against rattling. The slider is molded of a stiffly resilient plastic and the integral projections are also stiffly resilient to guidingly support the slider in the channel. Several modifications of the basic concept are shown.

BRIEF DESCRIPTION OF PREFERRED EMBODIMENTS

Figure 1:
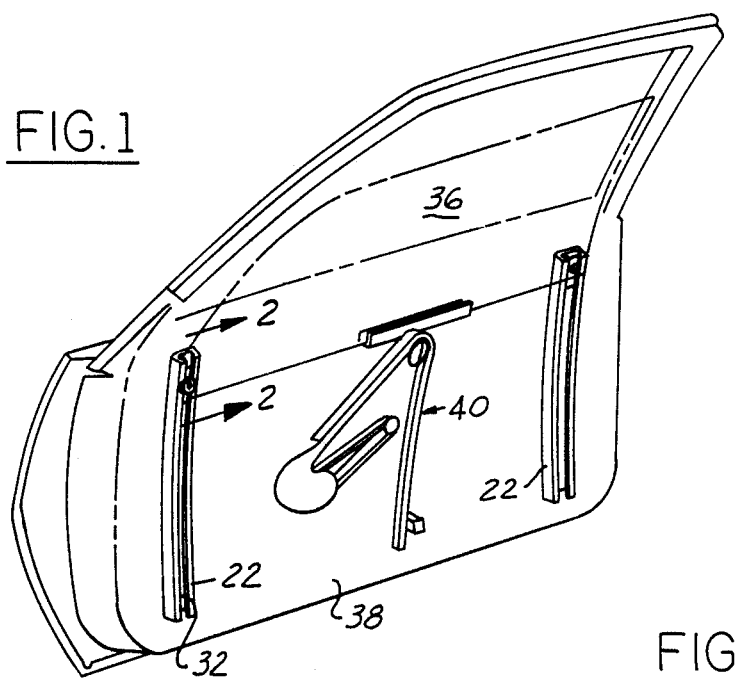
FIG. 1 is a perspective view of an automotive door showing our improved slider used therein.
Figure 3:
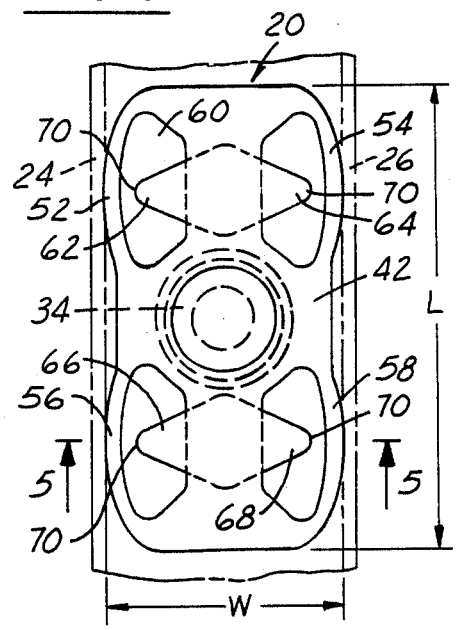
FIG. 3 is a plan view of the slider of FIG. 2 with the guide channel shown in phantom outline.
Figure 2:
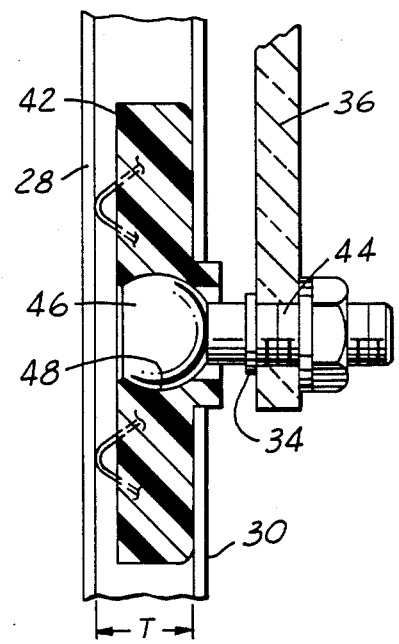
FIG. 2 is a cross-sectional view taken on the line 2—2 of FIG. 1.

As shown in the various figures of the drawings, the slider 20 is intended for use within an elongated guide channel 22 having a pair of spaced side walls 24 and 26 and a pair of spaced base walls 28 and 30 joined to the side walls. The base wall 30 is provided with an elongated slot 32 through which means 34 may project for mounting the window 36 to the slider. The guide channel 22 is of conventional construction in the automotive industry and is fastened to the vehicle door or other body section 38. One or more of the sliders 20 may be received in each guide channel 22 to guide and support the window 36 for movement therein. Mechanism 40 of conventional construction is provided for raising and lowering the window.

The slider is a plastic molded part, nylon type 6 or 66 manufactured by DuPont being preferred. The nylon or other plastic selected should have good stability and elasticity characteristics over the anticipated temperature and humidity conditions likely to be encountered in use. For purposes of the invention, we have characterized the material of which the slider is formed as being stiffly resilient. Its elasticity should be such that the various integral projections hereinafter described may flex within their elastic limits without fracture and without overstressing.

The slider is depicted herein in various embodiments. Common or similar elements in the various embodiments will be identified by like reference numerals distinguished by differing alphabetic suffixes.

Turning first to the preferred embodiment of FIGS. 2-5, the slider comprises a body member 42 having length L extending in the direction of the guide channel 22 into which the slider is received, a width W extending transversely between the side walls 24 and 26 and slidingly bearing thereagainst, and a thickness T extending between the base walls 28 and 30 and also slidingly bearing thereagainst. The means 34 for mounting the window to the slider is supported on the body member 42 medially of its length and width. Such means may comprise a ball stud having a threaded shank 44 terminating in a ball shaped head 46, rockably disposed in a complementary ball socket 48 formed in the body member. The fit of the ball head within the socket is sufficiently tight that no free play is allowed. Suitable washers and a nut 50 embrace the window 36 to mount the latter to the slider.

The body member 42 has integral stiffly resilient projections arranged in opposed pairs 52 and 54, and 56 and 58 disposed longitudinally on opposite sides of the ball socket 48 and extending laterally in one direction, i.e., in the direction of the width W of the body members. These projections are formed of the same material as the body member and are simply extensions of it. These projections extend in the direction of and are intended to bear against the side walls 24 and 25. These projections are generally bow shaped having a laterally extending arcuate portion which is integrally attached at opposite ends to the body member. An opening 60 in the body member provides a space into which the bow shaped projections may be elastically deflected or squeezed as the slider is introduced into the guide channel. For this purpose the lateral extent of the projections 52-58 should be such in relation to the maximum tolerance spacing between the side walls 24 and 26 that upon introducing the slider into the channel the projections will be squeezed slightly inwardly into the openings 60 to thereby bias the slider in one lateral direction in the channel against rattling.

Figure 4:
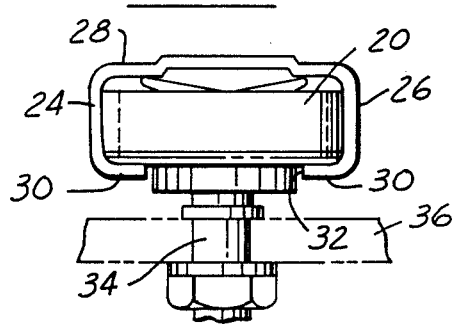
FIG. 4 is an end view of the slider of FIG. 3.

The design of the slider body is such as to prevent rattling in the guide channel 22 in the other lateral direction, i.e. in the direction of thickness T. To accomplish this the body is provided with integral stiffly resilient wing-like projections 62, 64, 66 and 68, extending laterally toward the base wall 28 of the guide channel. The lateral extent of these projections should be such in relation to the maximum tolerance spacing between the base walls 28 and 30 that upon introducing the slider into the guide channel the projections 62-68 will be deflected or squeezed slightly in a flattening direction to thereby bias the slider in the channel in the lateral direction against rattling. The projections 62-68 are generally triangularly shaped and extend laterally angularly toward the base wall 28 as best shown in FIGS. 4 and 5 to bear thereagainst.

Figure 5:
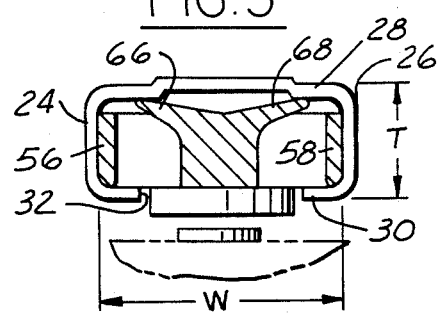
FIG. 5 is a cross-sectional view taken on the line 5—5 of FIG. 3.

Thus, as clearly shown in FIG. 5, there are two sets of integral, stiffly resilient projections biasing the slider in both lateral directions T and W within the guide channel whereby a smooth rattle free sliding action is obtained. As will be noted, the slider body with its projections is a one-piece molded part greatly simplifying the slider as compared particularly to the design in prior U.S. Pat. No. 3,466,802.

The other embodiments of the invention are modifications of the basic concept shown in FIGS. 2-5 of a one-piece molded plastic body having integral stiffly resilient projections extending laterally from the body in two lateral directions T and W. Thus, in FIGS. 6-8, the slider body 20a provided with a ball socket 48a, having a lateral flange portion 49 having projections 52a, 54a, 56a and 58a. These projections are arranged as were similar projections in the embodiment of FIGS. 2-5, in opposed pairs disposed longitudinally on opposite sides of the ball socket 48a. The projections 62a and 64a, which extend in the other lateral direction, i.e., toward base wall 28 when the slider is introduced into the guide channel, are arranged as a pair on opposite sides of the ball socket 48a and in alignment therewith. The projections are as before wing-like but in the form of regular trapezoids to provide a longer channel bearing edge 70a than the more pointed tip 70 of the FIGS. 2-5 embodiment. The projections 52a-58a while bow shaped, are connected at only one end to the body member, the other end 72 being free. These projections extend just beyond the body portions 74 and 76 which are intended to ride the side walls 24 and 26 of the guide channel should lateral forces be applied to the slider overcoming the resilience of the projections 52a-58a and displacing the slider laterally in the channel.

Figure 6:
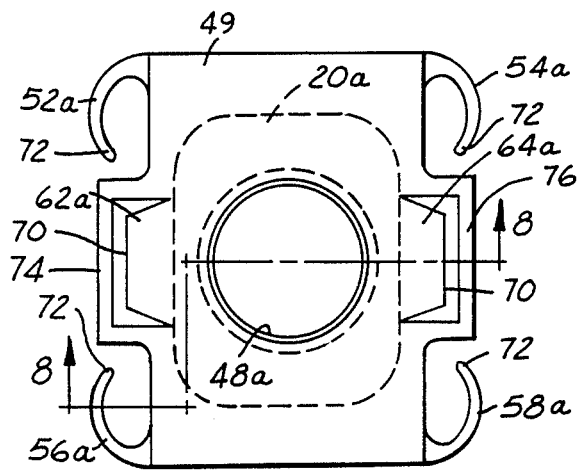
FIG. 6 is a plan view of a first modification of the slider.
Figure 7:
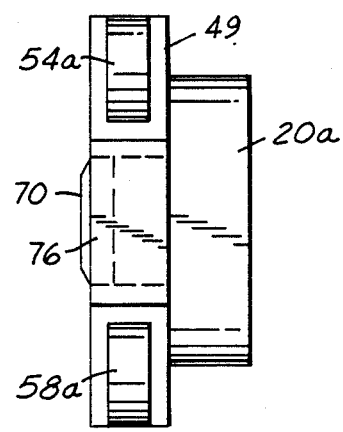
FIG. 7 is a side view of the slider of FIG. 6.
Figure 8:
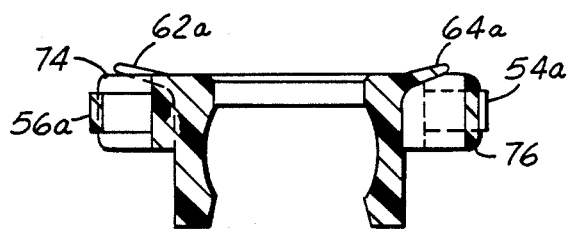
FIG. 8 is a cross-sectional view taken on the line 8—8 of FIG. 6.
Figure 9:
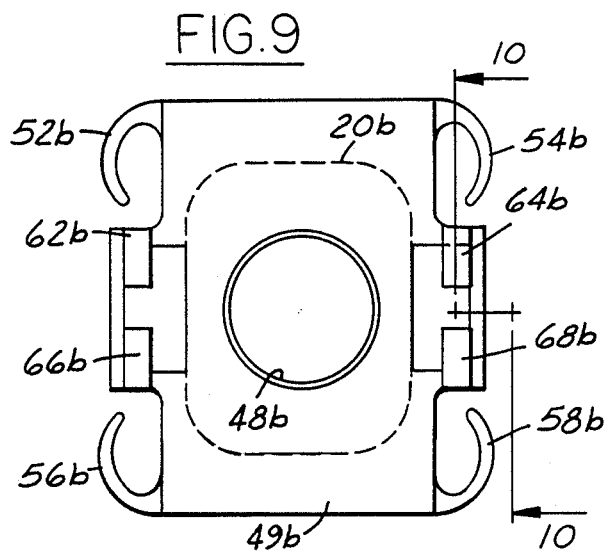
FIG. 9 is a plan view of a second modification of the slider.
Figure 10:
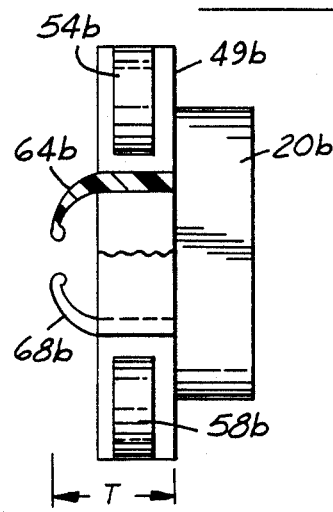
FIG. 10 is a cross-sectional view taken on the line 10—10 of FIG. 9.
Figure 11:
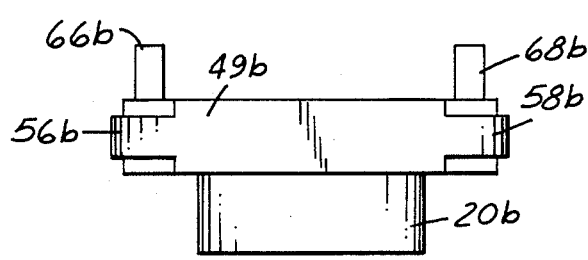
FIG. 11 is an end view of the slider of FIG. 9.

In the modification of FIGS. 9-11 the slider body 20b has a lateral flange portion 49b from which projections 52b-58b extend as in the embodiment of FIGS. 6-8. Projections in the form of a pair of bow shaped spring fingers 62b and 66b on one side of the socket 48b and 64b and 68b on the opposite side of the socket extend in the lateral direction T to bear against the base wall 28 of the guide channel. The projections 62b-68b are integral with the body flange 49b at one end but are free at the opposite end. Body portions 74b and 76b will as in the case of portions 74 and 76 in FIG. 6, limit the lateral displacement in one direction of the slider.

Figure 12:
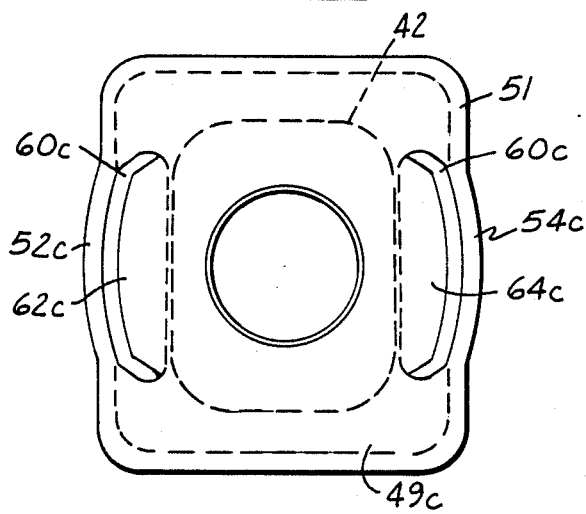
FIG. 12 is a plan view of a third modification of the slider.
Figure 13:
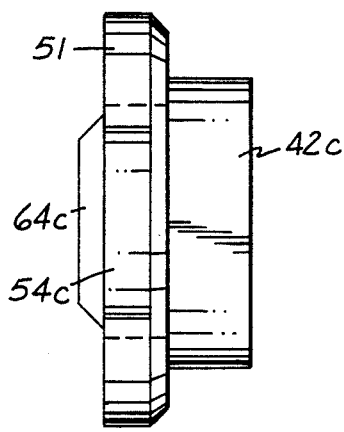
FIG. 13 is a side view of the slider of FIG. 12.

In the modification of FIGS. 12 and 13 the body member 42c has a lateral flange portion 49c with a depending marginal edge 51 rendering the slider somewhat hat-shaped in appearance. The flange portion 49c is longitudinally shorter than the preceding embodiments. The projections 52c and 54c are outwardly bowed portions of the marginal edge 51 and are stiffly resilient. The lateral flange portion 49c is provided with openings 60c opposite the bowed projections. Stiffly resilient wing-like projections 62c and 64c are disposed in the openings 60c and extend angularly toward and resiliently bear against the base wall 28 when the slider is introduced into the guide channel.

Figure 14:
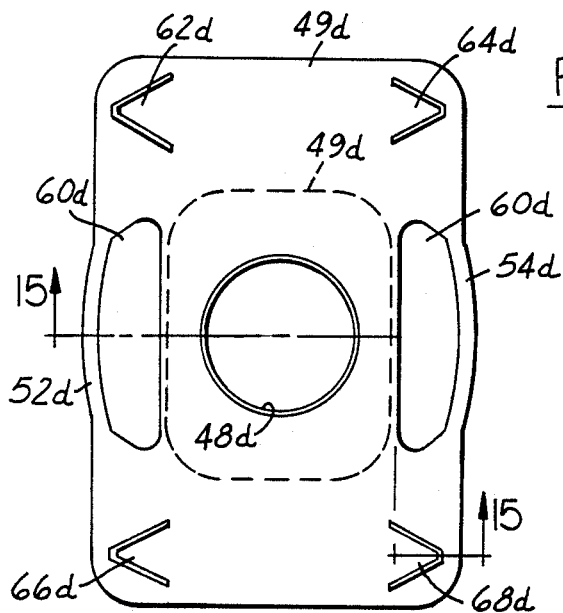
FIG. 14 is a plan view of a fourth modification of the slider.
Figure 15:
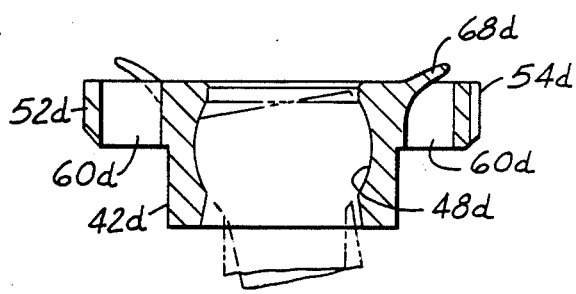
FIG. 15 is a cross-sectional view taken on the line 15—15 of FIG. 14.

In FIGS. 14 and 15 the slider body 42d again has a lateral flange portion 49d with a pair of oppositely arranged integral, stiffly resilient lateral projections 52d and 54d aligned with ball socket 48d. Openings 60d in the flange portion 49d provide spaces into which the bows may flex upon squeezing during introduction of the slider into the channel guideway. Wing-like projections 62d, 64d, 66d and 68d arranged in pairs on opposite longitudinal sides of socket 48d are provided in complementary openings in the body and extend laterally to resiliently bear against the base wall 28 when the slider body is introduced in the guideway channel.

Figure 16:
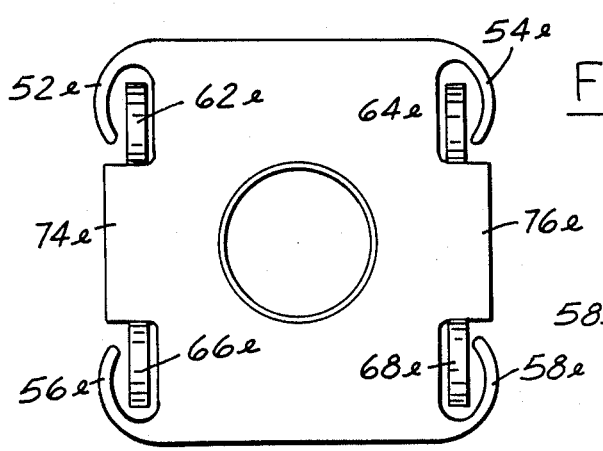
FIG. 16 is a plan view of a fifth modification of the slider.
Figure 17:
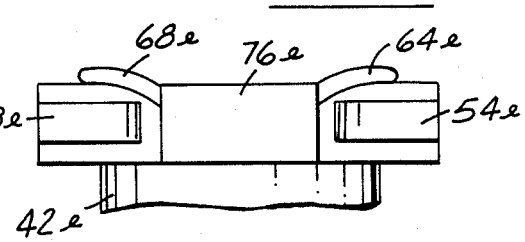
FIG. 17 is a side view of the slider shown in FIG. 16.

In FIGS. 16 and 17, a slider body 42e has a lateral flange portion 49e with bow shaped finger like projections 52e, 54e, 56e and 58e at its four corners. This slider is similar to that of FIGS. 6-8 except the projections 62e, 64e, 66e and 68e are bowed fingers integral at one end with a slider body and free at the opposite ends as shown in FIG. 17.

While we have described this slider in connection with the support of automotive vehicle windows, it should be understood that the principles and designs herein disclosed may find application in many other uses and we do not intend to be limited to the automotive field or the support and guidance simply of windows.

We claim:
1. A slider for use with an elongate guide channel having a pair of spaced side walls and a pair of spaced base walls joined to the side walls comprising:
   a body member formed of a stiffly resilient material adapted to be slideably received within the channel;
   said body member having integral stiffly resilient projections extending laterally in one direction toward a side wall and extending laterally in another direction toward a base wall of a guide channel when the slider is received therein, at least some of said projections being arranged in pairs spaced apart in the direction of the guide channel; and
   said projections having portions overlying the body member spaced therefrom and elastically squeezed against the side walls and base walls to provide a spring action for biasing the slider in the guide channel against rattling in both lateral directions.
2. The invention defined by claim 1 wherein said projections which extend laterally in one direction are bowed shaped.
3. The invention defined by claim 2 wherein each bow shaped projection is integral at opposite ends with the body member.

4. The invention defined by claim 2 wherein each bow shaped projection is integral at only one end with the body member and is free at the opposite end.

5. The invention defined by claims 1, 2, 3 or 4 wherein said projections which extend laterally in another direction are wing-shaped.

6. The invention defined by claim 1 wherein said body member has a length extending in the direction of a guide channel into which it is to be received and a width extending transversely between the side walls of the guide channel and means are provided medially of its length and width for connecting the body member to a device to be guided.

7. The invention defined by claim 6 wherein said projections which extend laterally in one direction are disposed longitudinally on opposite sides of said means.

8. The invention defined by claim 6 wherein said projections which extend laterally in another direction are disposed longitudinally on opposite sides of said means.

9. The invention defined by claim 6 wherein said projections which extend laterally in one direction and said projections which extend laterally in the other direction are disposed longitudinally on opposite sides of said means.

10. The invention defined by claim 9 wherein said projections are arranged in like pairs on opposite sides of said means.

11. The invention defined by claim 6 wherein either said projections which extend laterally in one direction or said projections which extend laterally in another direction are arranged as a pair on opposite sides of said means.

12. The invention defined by claim 11 wherein said projections which extend laterally in one direction are arranged in pairs at longitudinally opposite sides of said means, and said projections which extend laterally in another direction are arranged as a pair on opposite sides of said means.

13. The invention defined by claim 12 wherein said projections which extend laterally in another direction and are arranged as a pair on opposite sides of said means comprise pairs of bow shaped projections on opposite sides of said means.

14. The invention defined by claim 11 wherein all of said projections are arranged as pairs on opposite sides of said means.

15. The invention defined by claim 6 wherein said projections extending laterally in one direction are disposed in opposition and in alignment with said means, and said projections which extend in another direction are arranged in pairs disposed longitudinally on opposite sides of said means.

16. A slider for use with an elongate guide channel having a pair of spaced side walls and a pair of spaced base walls joined to the side walls comprising:
   a body member formed of a stiffly resilient material adapted to be slideably received within the channel;
   connecting means disposed medially of the length and width of the body member for connecting the body member to a device to be guided;
   said body member having integral stiffly resilient projections extending laterally in one direction toward a side wall and extending laterally in another direction toward a base wall of a guide channel when the slider is received therein, at least some of said projections being arranged spaced apart on opposite sides of said connecting means in the direction of the guide channel; and
   said projections having portions overlying the body member spaced therefrom and elastically squeezed against the side walls and base walls to provide a spring action for biasing the slider in the guide channel against rattling in both lateral directions.

* * * * *